United States Patent
Hackl et al.

(10) Patent No.: US 6,345,681 B1
(45) Date of Patent: Feb. 12, 2002

(54) METHOD OF ACTUATING STEER-BY-WIRE VEHICLE STEERING DRIVE MECHANISM

(75) Inventors: Matthias Hackl, Vaihingen; Wolfgang Kraemer, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,838
(22) PCT Filed: Aug. 1, 1998
(86) PCT No.: PCT/DE98/02216
 § 371 Date: Jul. 20, 2000
 § 102(e) Date: Jul. 20, 2000
(87) PCT Pub. No.: WO99/29557
 PCT Pub. Date: Jun. 17, 1999

(30) Foreign Application Priority Data

Dec. 6, 1997 (DE) .......................................... 197 54 258

(51) Int. Cl.[7] .............................. B62D 5/06; B62D 5/04
(52) U.S. Cl. ...................... 180/402; 180/443; 180/446; 701/41; 701/42
(58) Field of Search ................................ 180/402, 443, 180/446; 701/41, 42

(56) References Cited

U.S. PATENT DOCUMENTS 6,176,341 B1 * 1/2001 Ansaril ....................... 180/402

* cited by examiner

Primary Examiner—Brian L. Johnson
Assistant Examiner—Matthew Luby
(74) Attorney, Agent, or Firm—Ronald E. Greigg

(57) ABSTRACT

A method for actuating a "steer-by-wire" steering drive mechanism by means of at least two triggerable control motors and gear units downstream of them, by which a gear element, connected to the wheels, can be driven simultaneously, is characterized in that the two control motors can be triggered independently of one another in such a way that by them both, drive forces in both the same direction and opposite directions and of equal or different amounts oriented in both the same and in opposite directions can be generated simultaneously.

20 Claims, 4 Drawing Sheets

METHOD OF ACTUATING STEER-BY-WIRE VEHICLE STEERING DRIVE MECHANISM

BACKGROUND OF THE INVENTION

1. Field of the Invention

The invention relates to a method for actuating a "steer-by-wire" steering drive mechanism by means of at least two triggerable control motors and gear units downstream of them, by which a gear element, connected to the wheels, can be driven simultaneously.

2. Description of the Prior Art

In steer-by-wire steering drive mechanisms, either a so-called mechanical fallback plane or redundant control motors are needed. The mechanical fallback plane can be achieved for instance by a direct transmission of force from the steering wheel to the wheels to be steered if the control motors should fail. In the case of redundant control motors, some of these motors can take on the task of the others in emergencies. A steer-by-wire drive mechanism that has redundant control motors is taught for instance by U.S. Pat. No. 4,741,409, which describes single-wheel control.

As in all steering systems, even in such steer-by-wire steering drive mechanisms any steering play that occurs is problematic.

The object of the invention is therefore to refine a generic method for actuating a "steer-by-wire" steering drive mechanism in such a way that any steering play that may occur is maximally avoided, while producing as little irritating noise as possible.

SUMMARY OF THE INVENTION

In a method for actuating a steer-by-wire steering drive mechanism of the type defined at the outset, the above object is attained in that the two control motors can be triggered independently of one another in such away that by them both, drive forces in both the same direction and opposite directions and of equal or different amounts oriented in both the same and in opposite directions can be generated simultaneously.

Because of the capability of triggering the two control motors independently of one another in such a way that they simultaneously generate drive forces in the same direction or in particular in opposite directions of equal or different amounts, it is made possible and in an especially advantageous way that on the one hand the play is compensated for continuously by the generation of oppositely oriented drive forces. On the other hand, even high steering angle forces can be generated by drive forces in the same direction, which are required in particular in extreme situations.

The control motors are triggered such that they generate forces or drive moments in the same direction, if a customarily high steering force has to be exerted, then the two control motors are preferably triggered.

To achieve the most optimal possible compensation for the steering play, it is advantageously provided that the motors are triggered such that in normal operation, a steering angle in one direction is brought about only by actuation of one control motor, while simultaneously with this an actuation of the other control motor in the opposite direction is effected to generate a defined braking moment or a defined braking force. In this way, the entire steering drive mechanism is tensed somewhat, which highly effectively prevents any steering play.

To enable adapting the braking moment or braking force to different steering requirements, resulting in particular from different driving or road conditions and the like, it is advantageously provided that the magnitude of the braking moment or of the braking force is variable.

In another highly advantageous embodiment, the braking moment or the braking force is adjusted such that over all the steering angles, a constant difference in the drive forces generated by the two control motors ensues. Because of this difference in drive forces, which represents a tensing force, continuous tensing of the steering drive mechanism is made possible during normal operation.

To improve this tensing still further and in particular also to prevent play during very rapid adjusting motions, in an advantageous embodiment it is provided that superimposed on the forces generated by the two control motors, each of the forces having an opposite sign, is a force component that is proportional to the differential rpm of the control motors. As a result, differential vibrations of the motors, which can arise from elasticities in components of the motors and of the gear units, are in particular damped highly effectively.

Purely in principle, the most various motors can be used as the control motors. Hydraulic motors, for instance, are conceivable. Advantageously, electric motors are used as the control motors.

BRIEF DESCRIPTION OF THE DRAWINGS

The foregoing and other objects and advantages of the invention will be apparent from the detailed description contained herein below, taken in conjunction with the drawings, in which.

DESCRIPTION OF THE PREFERRED EMBODIMENTS

Figure 1:
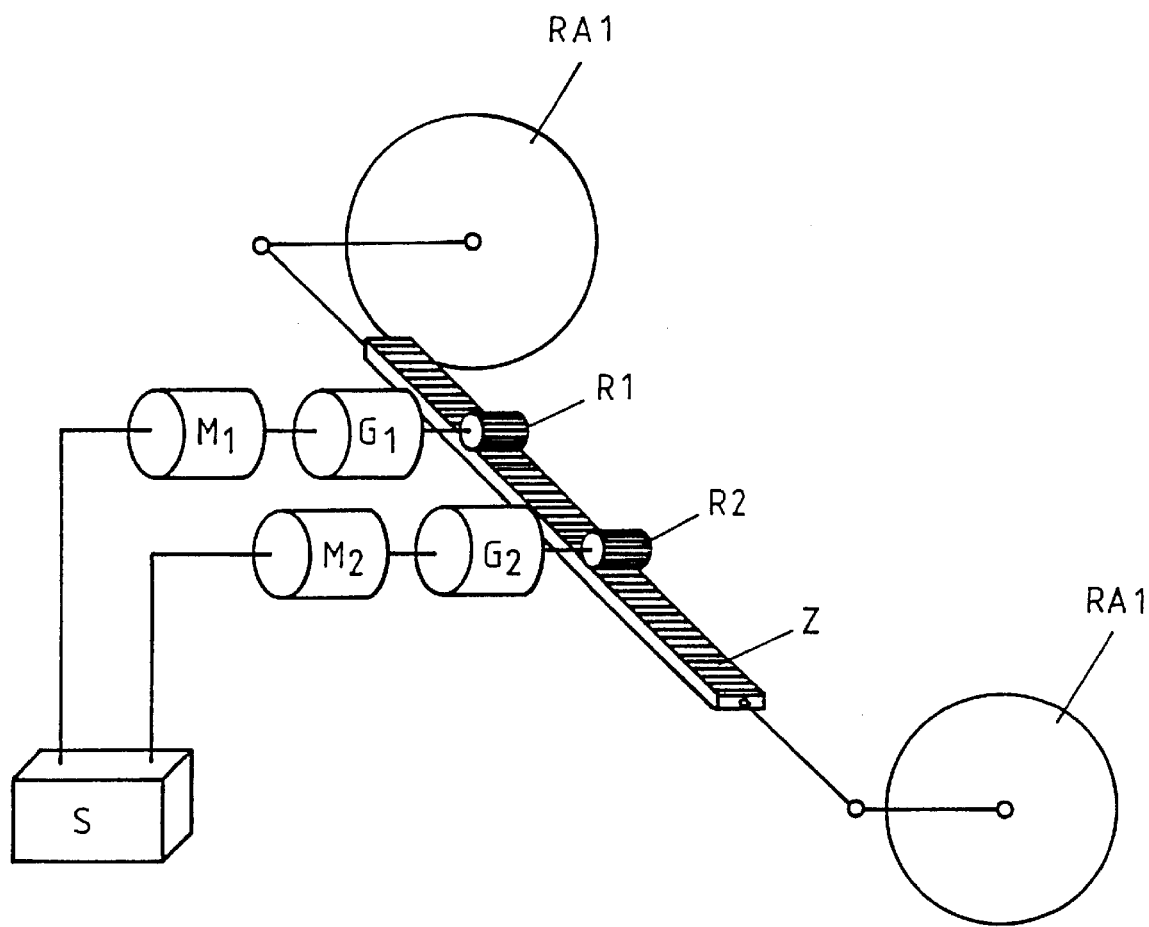
FIG. 1, schematic illustrating, a steer-by-wire steering drive mechanism in which the method of the invention is employed.

A steer-by-wire steering drive mechanism shown schematically in FIG. 1 includes two control motors M1, M2, for instance electric motors, each of which is followed by a gear unit G1, G2, which by way of pinions R1, R2 simultaneously drive a gear element, connected to the wheels RA1, RA2 and taking the form of a rack Z that causes steering motions at the wheels RA1, RA2. The two motors M1, M2 can be triggered by a control circuit S.

Methods for eliminating any steering play that might occur will now be described in conjunction with FIGS. 2–4.

Figure 2:
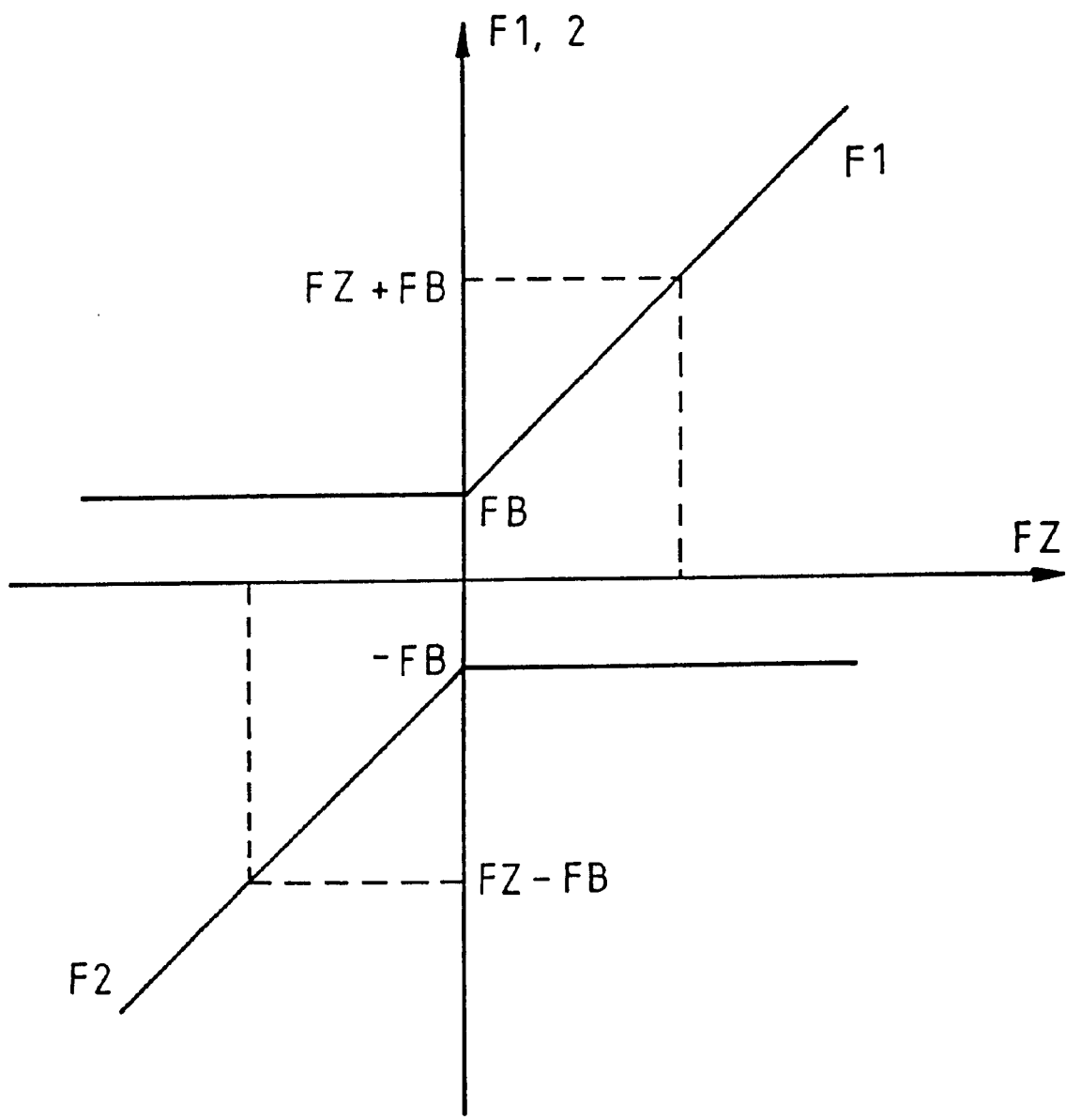
FIG. 2, is, a force graph schematically illustrating a first exemplary embodiment of the method of the invention.
Figure 3:
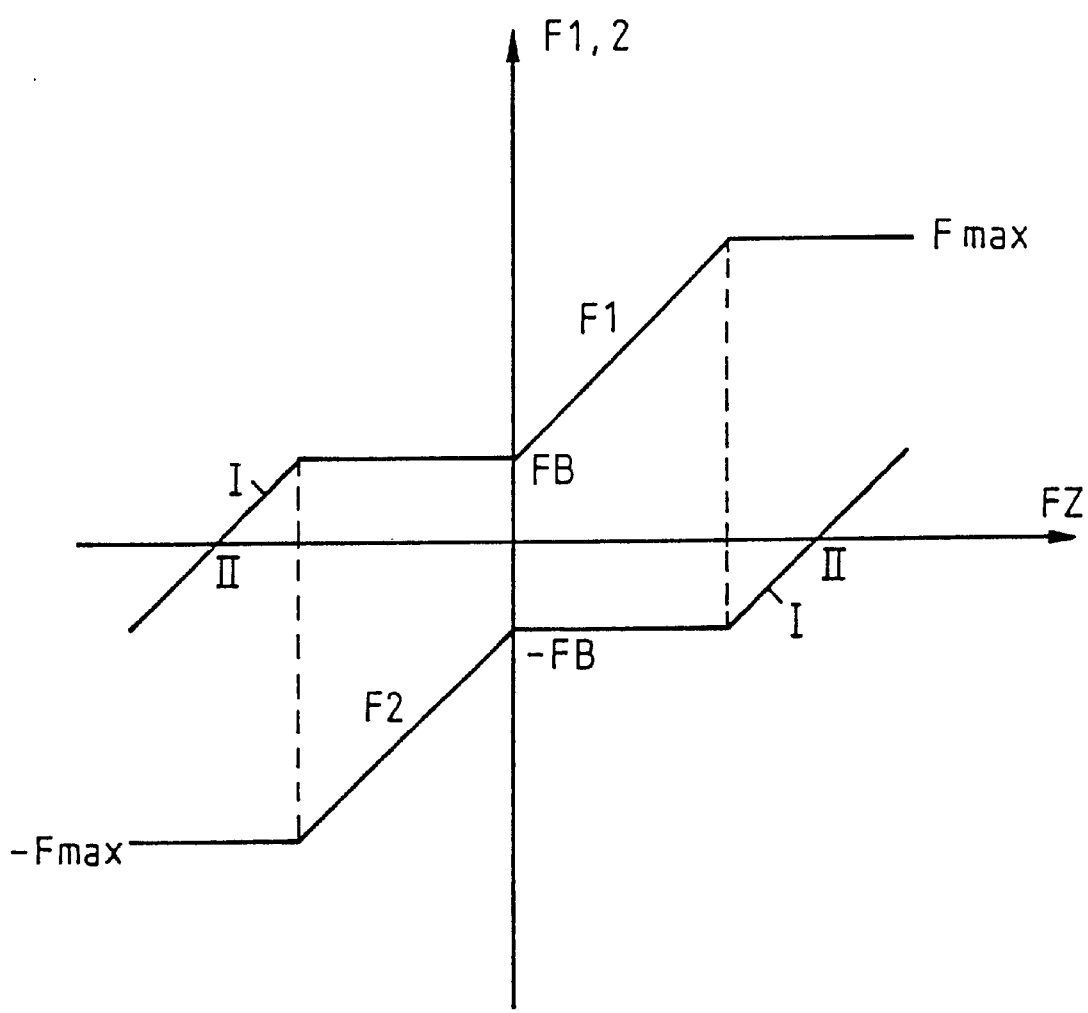
FIG. 3, is, a force graph schematically illustrating a further exemplary embodiment of the method of the invention.
Figure 4:
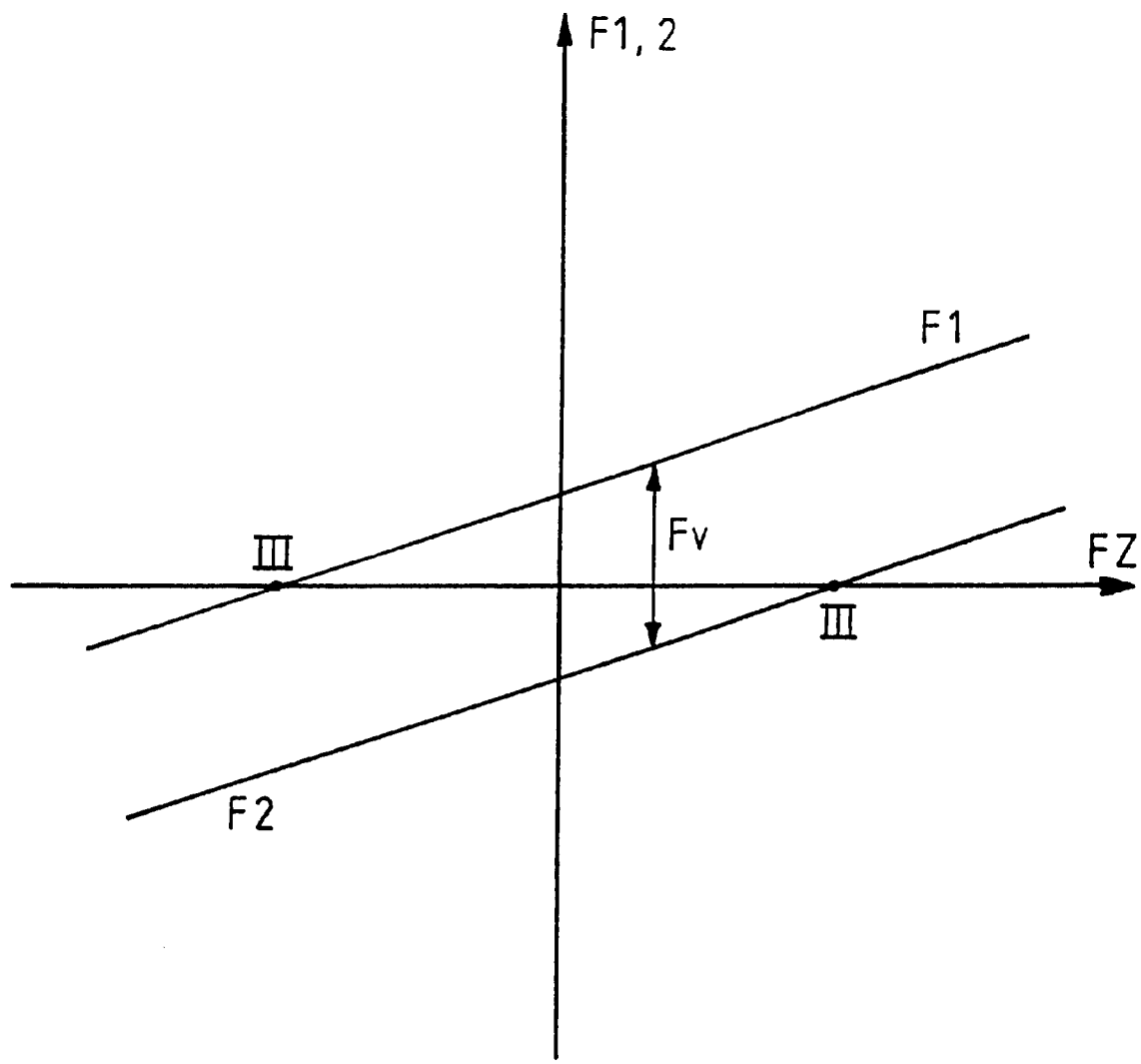
FIG. 4, is, a force graph schematically illustrating a yet another exemplary embodiment of the method of the invention.

In FIGS. 2–4, the forces F1, F2 generated by the control motors M1 and M2 respectively are each plotted over the rack force FZ.

As seen from FIG. 2, if the rack force FZ is positive, then the control motor M1 is triggered such that by way of the gear unit G1 downstream of it and the pinion R1 actuated by this gear unit, a rack force FZ on the rack Z is generated that is substantially proportional to the drive force F1. Simultaneously to this, the control motor M2 is triggered such that via the gear unit G2 downstream of it and the pinion R2, a constant braking force −FB on the rack is generated. It should be noted that the motor MI exerts a force on the rack Z in one direction, for instance to the left in FIG. 1, while conversely the control motor M2 generates a force in the opposite direction, for instance to the right in FIG. 1. Upon a steering angle to the left, in this way, by the control motor M1 via the gear unit G1 and pinion R1, a leftward-oriented drive force F1 on the rack Z is generated, while simultaneously a rightward-oriented braking force FB is generated by the drive motor M2. Conversely, upon a steering angle to the right, a drive force F2 to the right is generated on the rack Z by the drive motor M2 and the gear unit G2 downstream of it as well as the pinion R2, while simultaneously a braking force FB to the left is generated by the drive motor M1.

As a result, defined tensing forces are generated in the steering drive mechanism, namely a rightward-oriented tensing force in the event of a steering angle to the left and a leftward-oriented tensing force in the event of a steering angle to the right. Because of these tensing forces, it is attained that the gear wheels of the gear units and the pinions R1, R2 all always rest on the same tooth flanks of the rack Z, and as a result plays have no effect. In the example shown in FIG. 1, the pinion R1 downstream of the control motor M1 always rests on the left tooth flanks of the rack Z, while conversely the pinion R2 downstream of the control motor M2 always rests on its right tooth flanks.

If a rack force in the positive direction is for instance required, for instance to accomplish a steering motion to the left, then the control motor M1 and the gear unit G1 downstream of it furnishes a motor force F1=FZ+FB via the pinion R1, while conversely M2 furnishes a force F2=−FB, as FIG. 2 shows. It will be understood that each control motor M1, M2 has to be able to generate forces great enough that the maximum required rack force FZmax is attainable; that is, the applicable relationship must be: Fmax>FZmax+FB; Fmax is the maximum force of one control motor M1, M2.

Then, if for instance when steering while stopped (under poor road conditions) or in other circumstances the individual control motors M1, M2 cannot generate high enough forces to cause a steering angle, then the actuation of the steering drive mechanism can be done in the way explained below in conjunction with FIG. 3. As FIG. 3 shows, the braking force FB can be varied, and in the case shown in FIG. 3 reduced, if the drive force of the driving control motors M1, M2 is insufficient (range I). If no braking force at all is available any longer (points II), then the control motor M1 or M2 that performs braking in the normal operating state can also be triggered in such a way that it generates a drive force in the same direction as the other motor that does the driving in a normal operating state. In that case, however, any steering play that may be present will become operative. This case occurs only in exceptional situations.

In yet another exemplary embodiment, explained in conjunction with FIG. 4, the two motors M1, M2 are triggered in such a way that by way of all the steering angles, a constant difference between the drive forces generated by the two control motors M1, M2 is established. This differential force, functioning as a tensing force FV, compensates for any steering play that may be present in the normal operating state. As described above, in these cases as well, when the rack forces are extraordinarily high, both motors M1, M2 are used for driving, but with a change of sign of 1 motor force at a time (see points III), any steering plays that are present become operative.

The tensions described above can be further improved by superimposing an additional component on the motor forces F1, F2; this component depends on the difference in the rotary speeds of the motors M1, M2 and damps the differential motion. For a proportional imposition, the following equations then apply:

$$F1' = F1 + K \times (\omega 2 - \omega 1),$$

$$F2' = F2 - K \times (\omega 2 - \omega 1)$$

in which F1', F2' represent the forces generated by the motors M1, M2; F1, F2 is the force component of the motors M1, M2 that results from the characteristic tension curve; K is an amplification factor; and $\omega 1$, $\omega 2$ are the rotary speeds of the motors M1, M2.

The addition of such force components prevents plays from becoming operative even during rapid adjusting motions. Furthermore, differential vibrations of the motors, which can occur because of elasticities in the gear unit components, shafts and the like, are damped.

If one motor fails, tensing is no longer possible. In that case, the triggering of the motor that is still functioning can be done by way of an emergency program without tension.

The especially great advantage of the method described above is considered to be in particular that in designing the steering drive mechanisms, it is no longer necessary to provide for freedom from play. As a result, greater tolerances are allowable in production, and thus the production costs are reduced considerably. By triggering of the motors M1, M2, the characteristic tension curves can be selected in such a way, and modified via parameters, that either the play does not become operative under any circumstances (tension represented by the characteristic curve of FIG. 2), or a play becomes operative only briefly under extremely high steering forces (see FIG. 3, FIG. 4). Electric motors with a preferential direction of rotation can be used; the preferential direction of rotation corresponds to the usual drive direction of that particular motor. As a result, either greater motor forces can be generated, or smaller motors can be used.

The foregoing relates to preferred exemplary embodiments of the invention, it being understood that other variants and embodiments are thereof possible within the spirit and scope of the invention, the latter being defined by the appended claims.

We claim:

1. A method for actuating a steer-by-wire steering drive mechanism by means of at least two triggerable redundant control motors (M1, M2) and gear units (G1, G2) downstream of the gear motors, by which a gear element (Z), connected to wheels (RA1, RA2), is driven simultaneously, wherein the two control motors (M1, M2) can be triggered independently of one another in such a way that by them, drive forces (F1, F2) in the same direction and of different amounts and drive forces (F1, F2) oriented in opposite directions and of equal or different amounts are generated simultaneously, to establish a difference, representing a tensing force, between the drive forces (F1, F2).

2. The method of claim 1, wherein the control motors (M1, M2) are triggered such that in normal operation, a steering angle in one direction is brought about only by actuation of one control motor (M1 or M2), while simultaneously with this an actuation of the other control motor (M2 or M1) in the opposite direction is effected to generate a defined braking moment or a defined braking force.

3. The method of claim 2, wherein the magnitude of the braking moment or of the braking force is variable.

4. The method of claim 2, wherein the braking moment or the braking force is adjusted such that over all the steering angles, a constant difference in the drive forces (F1, F2) generated by the two control motors (M1, M2) ensues.

5. The method of claim 1, wherein superimposed on the forces generated by the two control motors (M1, M2), each of the forces having an opposite sign, is a force component that is proportional to the differential rpm of the control motors (M1, M2).

6. The method of claim 1, wherein electric motors are used as the control motors (M1, M2).

7. The method of claim 3, wherein the braking moment or the braking force is adjusted such that over all the steering angles, a constant difference in the drive forces (F1, F2) generated by the two control motors (M1, M2) ensues.

8. The method of claim 2, wherein superimposed on the forces generated by the two control motors (M1, M2), each of the forces having an opposite sign, is a force component that is proportional to the differential rpm of the control motors (M1, M2).

9. The method of claim 3, wherein superimposed on the forces generated by the two control motors (M1, M2), each of the forces having an opposite sign, is a force component that is proportional to the differential rpm of the control motors (M1, M2).

10. The method of claim 4, wherein superimposed on the forces generated by the two control motors (M1, M2), each of the forces having an opposite sign, is a force component that is proportional to the differential rpm of the control motors (M1, M2).

11. The method of claim 1, wherein superimposed on the forces generated by the two control motors (M1, M2), each of the forces having an opposite sign, is a force component that is proportional to the differential rpm of the control motors (M1, M2).

12. The method of claim 2, wherein electric motors are used as the control motors (M1, M2).

13. The method of claim 3, wherein electric motors are used as the control motors (M1, M2).

14. The method of claim 4, wherein electric motors are used as the control motors (M1, M2).

15. The method of claim 5, wherein electric motors are used as the control motors (M1, M2).

16. The method of claim 7, wherein electric motors are used as the control motors (M1, M2).

17. The method of claim 8, wherein electric motors are used as the control motors (M1, M2).

18. The method of claim 9, wherein electric motors are used as the control motors (M1, M2).

19. The method of claim 12, wherein electric motors are used as the control motors (M1, M2).

20. The method of claim 11, wherein electric motors are used as the control motors (M1, M2).

* * * * *